Feb. 17, 1970
R. F. JONES
3,495,550
CLUSTER MAKING MACHINE AND METHOD
Filed May 2, 1968
3 Sheets-Sheet 1
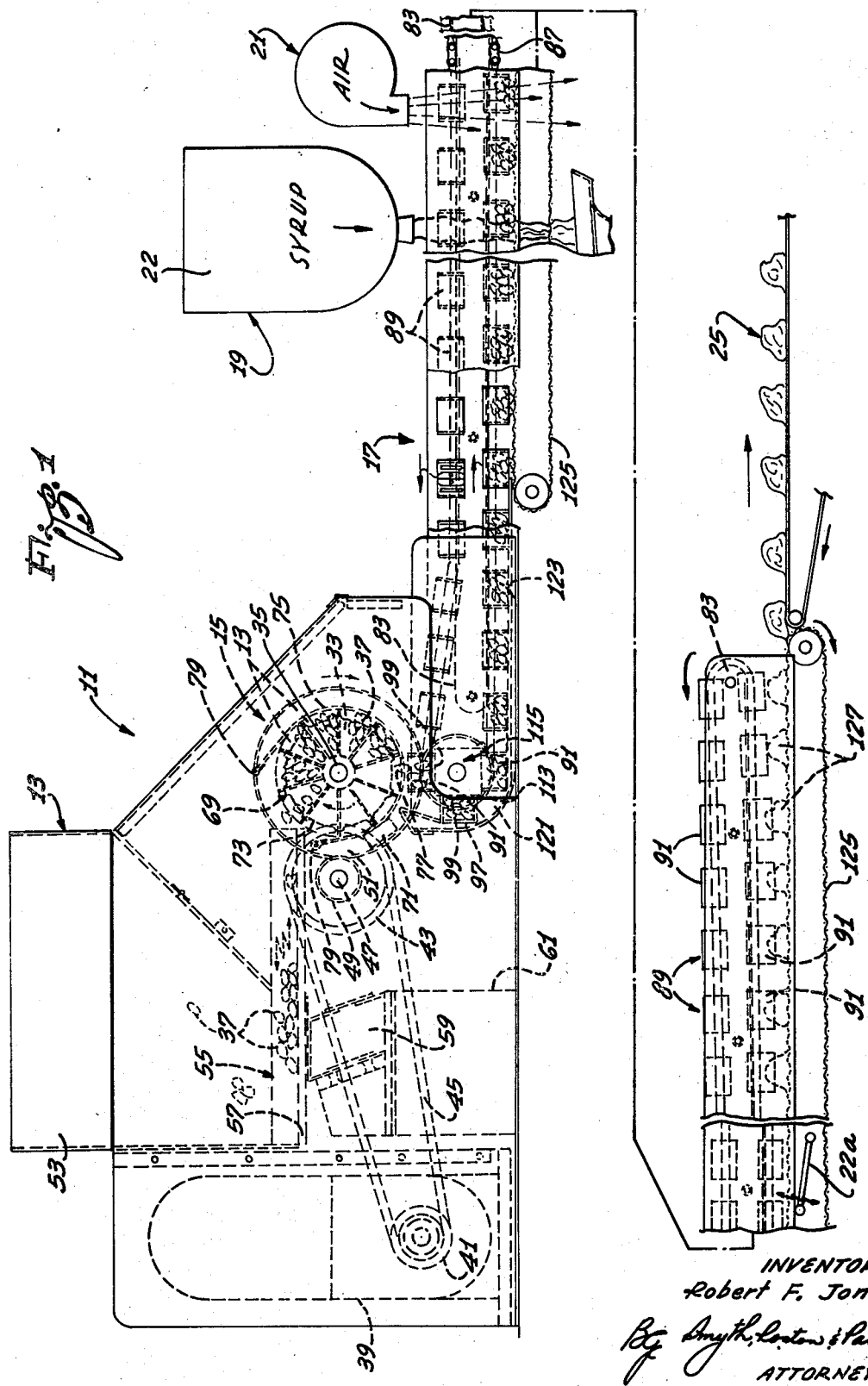
INVENTOR:
Robert F. Jones
By Smyth, Roston & Pavitt
ATTORNEYS

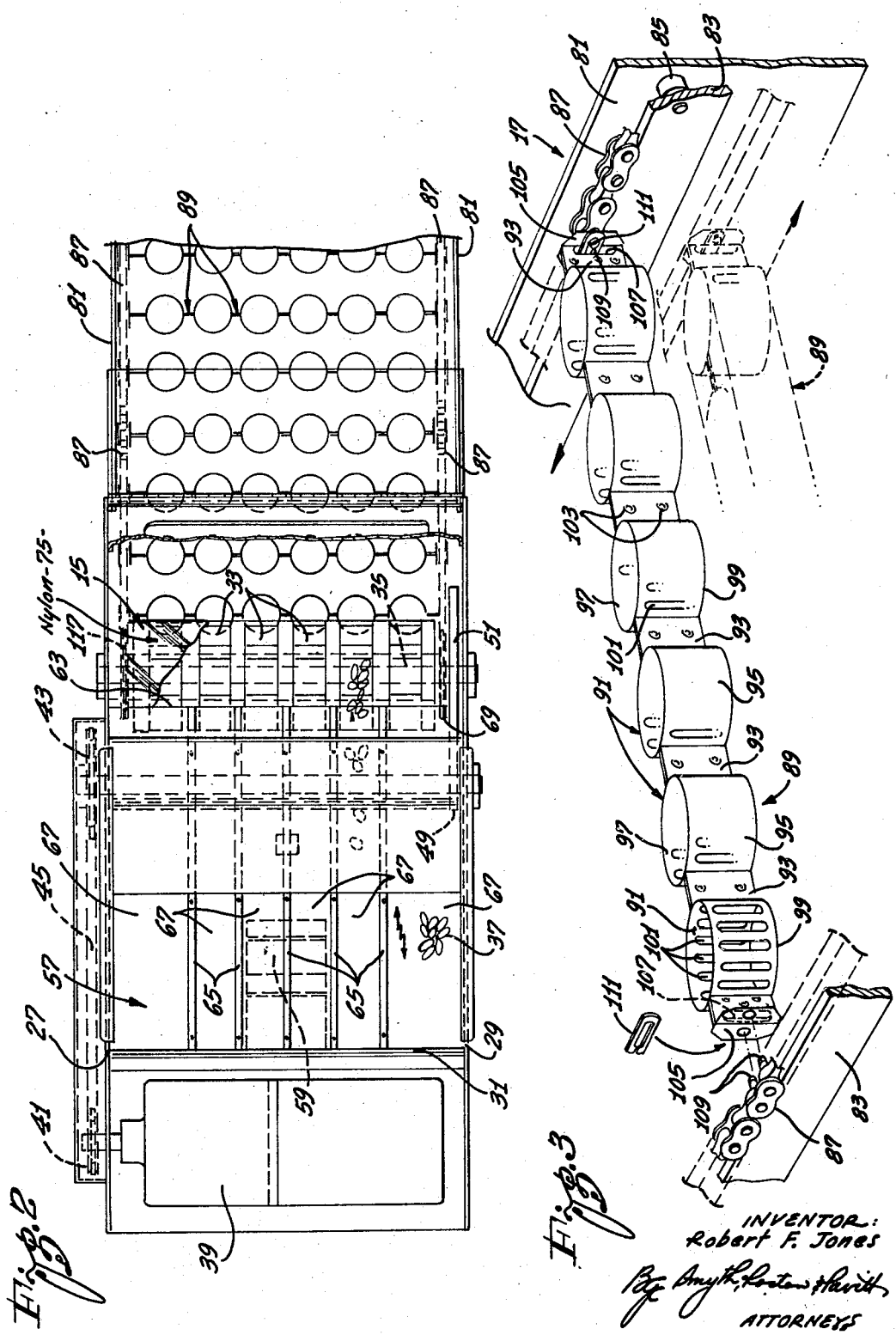

Feb. 17, 1970  R. F. JONES  3,495,550
CLUSTER MAKING MACHINE AND METHOD
Filed May 2, 1968  3 Sheets-Sheet 3

INVENTOR:
Robert F. Jones

ATTORNEYS

United States Patent Office 3,495,550
Patented Feb. 17, 1970

3,495,550
CLUSTER MAKING MACHINE AND METHOD
Robert F. Jones, Los Angeles, Calif., assignor to Hoffman Manufacturing Company, Glendale, Calif., a limited partnership
Filed May 2, 1968, Ser. No. 726,153
Int. Cl. A23g 3/00
U.S. Cl. 107—1     11 Claims

ABSTRACT OF THE DISCLOSURE

A method and machine for making a coated candy cluster. In a preferred form of the invention, the machine includes a rotatable rotor having a plurality of compartments. The rotor rotates the compartments between a filling station in which cluster material is deposited in the compartments and a discharge station at which the cluster material is discharged from the rotor onto a conveyer. Metering means responsive to rotation of the rotor control the amount of cluster material deposited in each of the compartments. The conveyer conveys the discharge cluster material to an enrober which coats the cluster material with chocolate or other suitable coating material.

BACKGROUND OF THE INVENTION

As is well known, coated candy clusters typically include cluster material such as raisins, nuts, etc. coated with chocolate. Coated clusters are made with a machine which includes means for depositing the cluster material in separate clusters on a movable conveyer. The conveyer conveys the cluster material to an enrober which coats the clusters with warm liquid chocolate. The chocolate is removed from the conveyer and then dried.

More particularly in a typical cluster making machine, cluster material is deposited in compartments of a drum or rotor which rotates about a horizontal axis. The cluster material is deposited within a compartment when such compartment faces generally upwardly to substantially prevent gravity flow of material therefrom. The rotor is then rotated to pivot such compartment to a discharge position at which the cluster material is moved from the compartment onto the conveyer.

Because the weight of food products must be exactly what it is stated on the container therefor, it is important that an accurate amount of the cluster material be metered into the compartment. Heretofore, the compartments have been sized so that when completely full, they contain the required amount of cluster material. To avoid overfilling, it is necessary to provide a brush or other similar device to remove any excess material from the top of the compartment. Thus, the rotor itself performs the metering and distributing functions. This arrangement is undesirable in that it is necessary to change the rotor or make other complicated adjustments whenever it is desired to use a different amount of cluster material.

The construction described above is also undesirable in that it shears some of the cluster material as it moves from the filling station to the discharge station. Specifically, a retainer is provided in close proximity to the rotor in an effort to retain the cluster material within the compartments of the rotor when the rotor is rotating between the filling and discharge stations. During this time the cluster material tends to fall out of the compartments and oftentimes some of the cluster material is sheared off by the rotor and retainer. The material thus sheared becomes wedged or trapped in between the retainer and the outer surface of the rotor. Raisins are particularly troublesome in this respect in that they are easily sheared, and when sheared are extremely gummy and messy. Prior art mechanical cluster machines are unsuited for coating raisin clusters. The trapped cluster material may offer significant resistance to rotation of the rotor and in addition is washed raw material. More important, however, the entrapped cluster material may become rancid or spoil and such conditions cannot be tolerated in food processing equipment. Accordingly, it is necessary to very frequently clean this portion of the machine. I have discovered that this shearing problem is created, in part, by completely filling of the compartments of the rotor with the cluster material.

The cluster material is often in granular form and it is difficult to retain such granular material in separate discrete clusters during the time that it is being conveyed to the enrober. Although various mechanisms have been devised for this purpose, they are generally relatively complex, difficult to clean and not suited for use with smaller enrobing machines.

SUMMARY OF THE INVENTION

The present invention eliminates the numerous problems experienced heretofore as a result of using the rotor to both meter and distribute the cluster material. This is accomplished by separating the metering and distributing function. Specifically, the present invention teaches utilizing a rotor having rotatively large compartments therein and using separate metering means to meter the cluster material into the compartment in insufficient quantities to completely fill the compartment. The rotor acts to distribute or deposit the cluster material on the conveyor but does not meter the cluster material. With this arrangement, the same rotor can be used for different size clusters thereby making the machine more versatile and eliminating the expense of purchasing and storing rotors of different sizes or of providing complex means for adjusting compartment size.

The present invention also teaches that by not completely filling the compartments with cluster material, the problem of shearing of the cluster material is eliminated. As the compartments are not completely full of cluster material, they contain some free space so that the cluster material is free to more tumble with the compartments as the rotor rotates from the filling station, at which the cluster material is deposited into the compartments, to the discharge station, at which the cluster material is removed from the rotor. As the cluster material is free to move within the compartments, the cluster material does not resist the efforts of the retainer to hold the cluster material within the compartments. Thus, the tendency of the cluster material to be sheared between the rotor and the retainer is eliminated.

To further reduce the shearing tendency of the cluster material, the retainer is preferably in the form of a flexible sheet. A flexible sheet makes a better retainer than a rigid plate because the sheet can be constructed of a low friction material so that it can be urged tightly against the peripheral surface of the rotor without imparting significant resistance to rotation thereof and without wearing the rotor. In addition, the flexible sheet inherently conforms to the peripheral surface of the rotor and tightly retains the cluster material within the compartments. By way of contrast a metal plate would have to be accurately machined at significant expense to obtain comparable conformity to the rotor surface.

According to the present invention, the metering of the cluster material is carried out as a function of the rotation of the rotor. In a preferred embodiment, a cam is mounted for rotation with the rotor and arranged to actuate a switch. The switch controls the length of time during which the supply means supplies or meters the material into the compartments. Different cams can be used to obtain different quantities of the cluster material. In a preferred embodiment of the invention, the supply means includes a vibratory feeder with one end of the table being located at the filling station. The vibratory feeder is vibrated by suitable drive means which is controlled by the cam operated switch.

The present invention also provides a unique and improved manner of conveying cluster material after it has been discharged from the rotor. Preferably, the conveyer moves along an endless path and defines a closed loop having one end portion of generally U-shaped configuration. The conveyer includes a plurality of cups each of which includes a peripheral wall and is open at both ends. The cluster material is deposited into the cups at the end of the conveyer.

As the inner and outer ends of the cups are open, the cups themselves cannot retain the cluster material. According to the present invention, however, a shaft is provided at the end of the conveyer which is sized and shaped to engage and close the inner ends of the cups when the cups are at such end of the conveyer. To simplify construction, the shaft is preferably the drive shaft for the conveyer. The shaft closes the inner end of the cups as the cups move through or around such end of the conveyer. A second retainer which preferably in the form of a flexible sheet closes the outer end of the cups after the cups have moved through the end of the conveyer.

The invention, both as to its organization and method of operation together with further features and advantages thereof may best be understood by references to the following description taken in connection with the accompanying illustrative drawing.

BRIEF DESCRIPTION OF THE DRAWINGS

FIG. 1 is a side elevational view of a cluster making machine constructed in accordance with the teachings of this invention.

FIG. 2 is a fragmentary top plan view of the left end portion of the cluster making machine which illustrates the vibratory feeder, the rotor, and a portion of the conveyer.

FIG. 3 is a perspective view illustrating the details of the conveyer.

DESCRIPTION OF THE PREFERRED EMBODIMENTS

Figure 4:
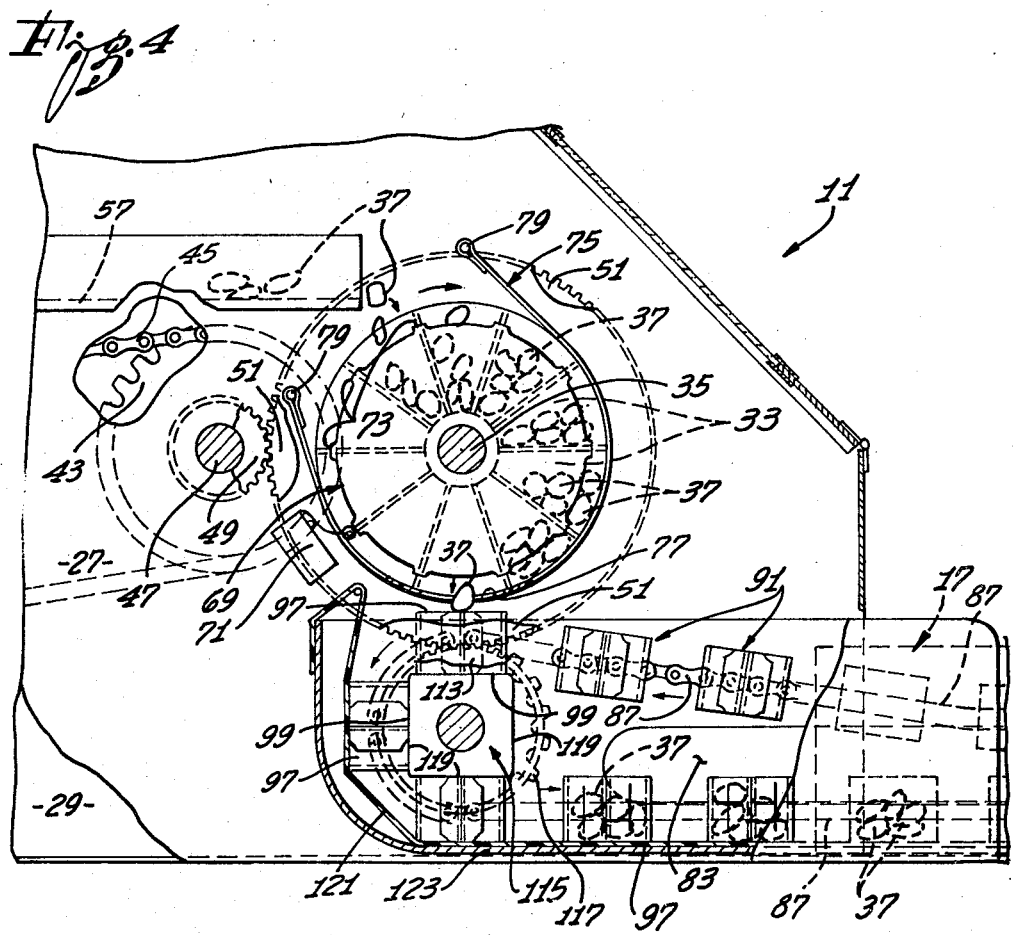
FIG. 4 is an enlarged elevational view of the rotor and the portions of the machine adjacent the rotor.

Referring to the drawings and in particular to FIG. 1 thereof, reference numeral 11 designates a cluster making machine constructed in accordance with the teachings of this invention. The machine 11 generally includes supply means 13, distributing means in the form of a rotor 15, a conveyer 17 and an enrober or coating mechanism 19. The enrober includes a blower 21, chocolate flow pan 22, a wire conveyer belt 125 and a vibrator 22a. A second conveyer 25 transports the coated clusters to another station where other work operations such as drying and packaging may be performed.

The machine 11 may include any suitable structural support arrangement and housing. In the embodiment illustrated, the machine 11 includes spaced parallel side plates 27 and 29 (FIG. 2) and a rear plate 31 joined to the side plates. The plates 27, 29 and 31 may be held together with any suitable structural members to provide a rigid frame or housing for the machine 11.

The rotor 15 includes a plurality of radially and axially spaced compartments 33 which open at the peripheral surface of the rotor 15. The rotor 15 is preferably generally cylindrical except for the compartments 33 and is mounted on a shaft 35 for rotation on the side plates 27 and 29.

The compartments 33 are sized to receive cluster material 37 which, in the embodiment illustrated, is in the form of granular material. As shown in FIG. 2, the compartments 33 are aligned in axially extending rows with each of the rows of compartments being spaced circumferentially from the adjacent row.

The rotor 15 is driven continuously by an electrical motor 39 which is preferably a variable speed electric motor. The drive means between the electric motor 39 and the rotor 15 includes a driving sprocket 41 and a driven sprocket 43 drivingly interconnected by a chain 45. The sprocket 43 is mounted on a shaft 47 which extends between the side plates 27 and 29. A pinion 49 is mounted on the shaft 47 (FIG. 2) and meshes with a driven gear 51 which is mounted on the rotor mounting shaft 35.

The supply means 13 supplies the cluster material 37 to the compartment 33 of the rotor 15. The supply means 13 includes a hopper 53 for storing relatively large quantities of the cluster material 37. The supply means 13 also includes a vibratory feeder 55 for conveying the cluster material 37 from the hopper 53 and depositing quantities thereof in each of the compartments 33. The vibratory feeder 55 may be of the type known as "Vibra-Flow" manufactured by Syntron Company of Homer City, Penn. The vibratory feeder 55 includes a generally horizontal table 57 and an electromagnetic drive means 59 for vibrating the table 57. The drive means 59 is suitably mounted on a base 61 (FIG. 1) beneath the table 57.

One end of the table 57 extends into the lower end of the hopper 53 and the other end of the table terminates in an end or edge 63 (FIGS. 2 and 4) which lies just above the rotor 15. A plurality of spaced parallel dividers 65 (FIG. 2) divide the upper surface of the table 57 into a plurality of troughs 67 with the number of troughs corresponding to the number of the compartments 33 in each axially extending row of compartments. With the electromagnetic means 59 operating, the table 57 vibrates to vibrate the cluster material 37 off of the end 63 of the table and into the compartments 33 at a fixed predetermined rate. Such predetermined rate may be varied by varying the supply voltage to the electromagnetic means 59 to thereby vary the amplitude of the vibrations and the feed rate.

The period of time during which the electromagnetic means 59 operates is controlled by the rotation of the rotor 15. In the embodiment illustrated, this control function is accomplished by a cam 69 and a microswitch 71 (FIGS. 1 and 4). As shown in FIGS. 1 and 4, the cam 69 is generally circular and has a plurality of circumferentially spaced projections or high regions 73 which are engageable with the switch 71 to actuate the latter. The switch 71 is suitably electrically connected to the electromagnetic means 59 so that when one of the projections 73 engages the switch, the electromagnetic means is energized to supply cluster material 37 to the compartments 33. Conversely, when the projections 73 are out of engagement with the switch 71, electromagnetic means does not operate and no cluster material 37 is supplied to the compartments 33. The cam 69 is mounted for rotation with the shaft 35 and it will be appreciated that cams of various contours can be utilized to vary the amount of cluster material supplied to the compartments 33.

Preferably, the cam 69 is selected so that the amount of cluster material 37 supplied to each of the compartments 33 is insufficient to completely fill the compartment. As shown in FIGS. 1 and 4, the cluster material 37 is supplied to the compartments 33 at a filling station at which the compartments open upwardly so that no gravity flow therefrom can occur. In the embodiment illustrated, the compartments 33 are supplied with the cluster material when they are at or near the eleven o'clock position. The rotor 15 in the embodiment illustrated rotates clockwise from the filling station to a discharge station at which the compartments open directly downwardly to permit gravity flow out of the compartments. In the embodiment illustrated the compartments 33 are in approximately a six o'clock position when the material is discharged therefrom.

In traveling between the stations, a retainer 75 engages the peripheral surface of the rotor 15 to prevent the cluster material 35 from falling out the open ends of the compartments 33. The retainer 75 has one or more apertures 77 located at the discharge station so that the cluster material 37 automatically falls from the compartments 33 through the apertures 77 onto the conveyer 17 when such compartments reach the discharge station. To this end, the number and/or size of the apertures 77 is selected so that each of the compartments 33 at the discharge station can have the cluster material discharged therefrom.

By not filling the compartments 33 completely with the cluster material 37, each of the compartments has some free space to allow the cluster material to tumble as the rotor rotates from the filling station to the discharge station. As the cluster material 37 is free to move within the compartments 33, it is much less likely to become forced between the peripheral surface of the rotor and the retainer 75.

The retainer 75 is preferably in the form of a relatively flexible sheet such as a nylon sheet. The flexible retainer 75 inherently conforms to the contour of the drum 15 and tightly holds the cluster material 37 within the compartments 33 to thereby guard against entrapment of the cluster material between the retainer and a rotor 15. The retainer 75 extends for the full axial length of the rotor 15 and extends over 270° around the rotor. In the embodiment illustrated, the retainer 75 is mounted by rods 79 provided at opposite ends of the retainer and suitably mounted on the frame of the machine.

The purpose of the conveyor 17 is to receive the discharged cluster material 37, confine the cluster material, and convey the cluster material through subsequent work stations. The details of the conveyer 17 can best be seen in FIG. 3. The conveyer 17 includes spaced parallel side support members 81 (only one being shown in FIG. 3). Each of the support members 81 has a flat bar 83 secured to the inner face thereof by fasteners 85. Sprocket chains 87 ride along the upper edges of the bars 83 which support and guide the chains.

A series of identical cup assemblies 89 are secured at their opposite ends to the chains 87. Each of the cup assemblies 89 is preferably constructed of sheet material and includes a plurality of cups 91 interconnected by integral webs 93. Although the cups 91 are generally cylindrical in the embodiment illustrated, it should be understood that the cups may be provided in various different configurations depending upon the desired shape of the final product. The number of cups 91 in each of the cup assemblies 89 conforms to the number of compartments 33 in an axially extending row of the compartments. Each of the cups 91 includes a peripheral wall 95, an open outer end 97 and an open inner end 99. The peripheral wall 95 may have slots 101 formed therein.

The cup assembly 89 can be advantageously formed from two strips of sheet metal, each of which is bent to form half of each of the cups 91 and half the thickness of the webs 93. These two strips of sheet metal, in the embodiment illustrated, are secured together as by spot welds 103.

Flanges 105 are formed at the opposite ends of each of the cup assemblies 89. The outermost webs 93 have slots 107 formed therein and pins 109 of the sprocket chains 87 project through apertures in the web 105. A split ring retainer 111 extends through each of the slots 107 and is received within grooves on the ends of the pins 109. Thus, the cup assemblies 89 can be moved by moving the chains 87.

As best shown in FIG. 1, the conveyer 17 moves along an endless path which defines a closed loop with one end portion of the loop defining a generally U-shaped portion which lies beneath the rotor 15. As the cups 91 are to receive the discharged cluster material 37 from the rotor 15, it is important that the cups move in timed relation to the rotation of the rotor. To assure proper sequencing of rotor and conveyer movements, the conveyer is driven by the gear 51 through another gear 113 (FIGS. 1 and 4) which is mounted on a shaft 115 of the conveyer. The shaft 115 extends between the support members 81 and has a pair of sprockets 117 (only one being shown in FIG. 2), mounted on the opposite ends thereof for driving the sprocket chains 87 and the cups 91. As the rotor 15 drives the conveyer 17, the desired sequencing of movements therebetween is assured.

As the ends 97 and 99 of the cups 91 are open, it is important that means be provided to close at least the lower end of the cups during the time that the cups have the cluster material therein. To this end, the shaft 115 is sized and shaped to close the inner ends 99 of the cups 91 when the cups are at the end of the conveyer 17 immediately beneath the rotor 15. In the embodiment illustrated, the shaft 115 is of square cross section, it being understood that other configurations which serve to close the inner ends 99 of the cups may be used. As shown in FIGS. 1 and 4, the shaft 115 has four flat surfaces 119 with the upper flat surface engaging and closing the inner ends 99 of the cups 91 positioned at the discharge station. Similarly, the lower and outer vertical surfaces 119 of the shaft 115 engage adjacent rows of cups 91 as shown in FIGS. 1 and 4. The conveyer 17 moves counterclockwise as shown in FIG. 1 and the shaft 115 moves with the cups 91 to continue to close the inner ends thereof. That is, the flat surfaces 115 of the shaft follows the cups 91 completely around the U-shaped end portion of the conveyer 17 thereby preventing the cluster material 17 from falling out of the inner end of the cups.

To prevent the cluster material 37 from falling out of the outer ends 97 of the cups 91, a retainer 121 is provided. The retainer 121 extends part of the way around the outside of the U-shaped end portion of the conveyer 17 and then a short distance along the path of the conveyer in the direction of movement of the conveyer. The retainer 121 is preferably in the form of a nylon sheet and may be similar to the retainer 75. The retainer 121 is suitably mounted at the opposite ends thereof. The retainer 121 is flexible and conforms to the changes of contour presented to it by the outer ends 97 of the cups 91 as they move through the U-shaped end portion of the conveyer. The horizontal portion of the retainer 121 is backed up by a rigid back-up member 123 so that the retainer 121 will have sufficient rigidity to support the cluster material 37 resting thereon. Thus, the moving cups 91 slide the cluster material contained therein along the stationary retainer 121 until the cups overlie a conveyer unit 125 (FIG. 1) which may be a belt conveyer. The conveyer unit 125 preferably moves at substantially the same speed as the cups 91 to thereby avoid any relative movement therebetween. The cluster material 37 is conveyed in this manner through an enrober 19 which deposits liquid chocolate on the cluster material contained within the cups 91. As shown in FIG. 1, the chocolate is allowed to drain through the upper cup assemblies 89 of the conveyer 17 onto the cluster material 37 in the lower cup assemblies to form coated clusters 127.

The conveyer then moves the coated clusters 127 beneath the blower 21 (FIG. 1) which removes the excess chocolate. The vibrator 22a vibrates the coated clusters 127 to pack the chocolate into the voids of the cluster material. Adjacent the end of the wire belt conveyer 125, the lower row of cups 91 are elevated leaving the coated clusters 127 on the moving conveyer 125. The empty cups 91 then pass around a U-shaped end portion 129 of the conveyer and return through the enrober 19 and beneath the chocolate flow pan 22 to the discharge station. By returning the empty cups 91 through the enrober and beneath the pan 22, the height of the machine is reduced. The coated clusters 127 are then transferred from the conveyer 125 to the conveyer 25 as shown in FIG. 1 and transported to another work station.

In operating of the machine 11, the hopper 53 is filled with cluster material 37 and the enrober 19 is supplied with chocolate. The motor 39 is then energized to drive the rotor 15 through the chain 45, the pinion 49 and the gear 51. The conveyer 17 is driven by the gear 51 through a second gear 113. When one of the projections 73 of the cam 69 engages the microswitch 71, the electromagnetic means 59 of the vibratory feeder 55 is energized to vibrate the table 57. This causes the cluster material 37 on the table to move longitudinally in the troughs 67 (FIG. 2) and off the end 63 of the table into the compartments 33. When the projection 73 is no longer engaging the microswitch 71 due to rotation of the rotor 15, the drive means 59 is deenergized and the flow of cluster material 37 of the compartments is halted. The rotor 15 rotates continuously and the cam 69 intermittently energizes the vibratory feeder 55 as each axially extending row of the compartments 33 is brought beneath the end 63 of the table 57. When the cluster material 37 in the compartments 33 reaches the discharge station, it falls through the apertures 77 in the retainer 75 into the cups 91 located immediately therebelow. The flat surfaces 119 of the shaft 115 prevents the cluster material from falling through the open inner ends 99 of the cups during the time that these cups move through the end portion of the conveyer which lies below the rotor 15. The retainer 121 closes the outer ends 97 of the cups 91 as the cups pass around the lower one half of the end portion of the conveyer 17. The conveyer 17 then transports the cups 19 containing the cluster material through the enrober 19.

I claim:
1. In a method of making a coated cluster, the steps of:
providing a rotor having at least one compartment therein opening at the peripheral surface of the rotor;
depositing cluster material in the compartment in a measured quantity insufficient to completely fill the compartment thereby only partially filling the compartment;
pivoting the rotor after said step of depositing to a discharge position in which the compartment is oriented to permit gravity flow of the cluster material out of the mouth thereof;
retaining the cluster material in said compartment during said step of pivoting to the discharge position whereby the cluster material in the partially filled compartment can move freely within the compartment during said step of pivoting to avoid shearing of the cluster material;
allowing the cluster material to fall by gravity at said discharge position of the rotor from the rotor onto a surface; and
coating the discharged cluster material with an edible material.

2. In a method of making a coated cluster, the steps of:
providing a rotor having a plurality of circumferentially spaced compartments therein with each of said compartments opening at the peripheral surface of the rotor;
rotating the rotor to sequentially bring each of said compartments through a filling station and a discharge station with the compartments being oriented at the discharge station in a manner to permit gravity flow out of the compartment;
sequentially depositing cluster material in the compartments as each such compartment passes through the filling station with the quantity of the cluster material being insufficient to completely fill the compartment thereby leaving some free space within the compartment;
retaining the cluster material within the compartments as the rotor rotates from said filling station to said discharge station with the free space within the compartments permitting free tumbling action of the cluster material within the compartments during rotation of the rotor to thereby avoid shearing of the cluster material;
allowing the cluster material to fall by gravity from each compartment when each such compartment is at said discharge station; and
coating the discharged cluster material with an edible material.

3. A method as defined in claim 2 wherein said step of depositing is carried out automatically and intermittently in response to rotation of the rotor.

4. A method as defined in claim 2 wherein said step of depositing includes placing some of the cluster material on a supporting surface and vibrating said surface to move some of the material thereon off the end of said surface and into the compartment at said filling station.

5. A method as defined in claim 2 including conveying the discharged clusters in cups to an enrober where said step of coating is carried out, removing the coated clusters from the cups and returning the cups through the enrober to the rotor.

6. In a cluster making machine, the combination of:
a rotor having a plurality of circumferentially spaced compartments therein opening at a peripheral surface of the rotor;
means for mounting said rotor for rotation about an axis to move each of said compartments sequentially from a filling station to a discharge station in which gravity flow out of said compartments can occur;
means for rotating said rotor about said axis;
supply means operable to supply cluster material to each of the compartments when such compartment is at the filling sation;
control means responsive to the rotation of said rotor for controlling the period of time in which said supply means operates to supply cluster material to each of said compartments to thereby regulate the quantity of cluster material supplied by said supply means to the compartments, the cluster material being discharged by gravity from the compartments as each such compartment reaches the discharge station;
an enrober for coating the discharged cluster material with an edible material; and
means for conveying the discharged material to the enrober.

7. A combination as defined in claim 6 wherein said control means causes said supply means to operate for an insufficient period of time to permit said supply means to completely fill the compartments.

8. A combination as defined in claim 6 wherein said supply means includes a table adapted to receive the cluster material thereon, said table having an end located at said filling station and means for vibrating said table to cause the cluster material thereon to fall off the end of said table into the compartment therebelow.

9. A combination as defined in claim 6 wherein said supply means includes electricaly powered means for operating said supply means and said control means includes a switch for operating said electricaly powered means and a cam rotatable with said rotor for operating said switch means.

10. A combination as defined in claim 9 wherein said axis about which said rotor rotates is generaly horizontal and said supply means includes a table with one end thereof positioned at said filling station above the compartment located at said filling station, said electrically powered means vibrating said table to cause the cluster material to fall off the end of the table into the compartment at said filling station.

11. In combination:
at least one cup;
means for depositing material in said cup;
means for supporting said cup for movement along an endless path defining a closed loop having one portion at which said path changes its direction whereby said cup can convey said material along said path;

said cup having a peripheral wall and open inner and outer ends, said inner end facing inwardly of said loop and said outer end facing outwardly of said loop;

a rotatable shaft mounted within said portion of said loops, said shaft being in close proximity to said inner face of said cup when said cup is at said portion of said loop to thereby permit said shaft to close said inner end of said cup when said cup is at said portion of said loop whereby said cup can retain material therein as it travels through said portion of said loop;

means for rotating said shaft;

means for drivingly interconnecting the shaft and the cup whereby rotation of said shaft drives said cup along said path;

means for closing at least one of said ends of said cup whereby rotation of said shaft drives said cup travels away from said portion of said path; and means along said path for coating said cluster material with an edible substance.

References Cited
UNITED STATES PATENTS

| | | | |
|---|---|---|---|
| 804,459 | 11/1905 | Ellingwood. | |
| 1,084,300 | 1/1914 | Savy. | |
| 1,938,423 | 12/1933 | Greer. | |
| 2,032,812 | 3/1936 | Quattrin et al. | |
| 2,109,336 | 2/1938 | Marsden | 118—13 |

WALTER A. SCHEEL, Primary Examiner

R. I. SMITH, Assistant Examiner

U.S. Cl. X. R.

107—54; 118—13, 21, 22, 24